(12) United States Patent
Krainer

(10) Patent No.: US 12,460,679 B2
(45) Date of Patent: Nov. 4, 2025

(54) SHAFT SYSTEM

(71) Applicant: Hitachi Energy Ltd, Zürich (CH)

(72) Inventor: Per Krainer, Ludvika (SE)

(73) Assignee: Hitachi Energy Ltd, Zürich (CH)

( * ) Notice: Subject to any disclaimer, the term of this patent is extended or adjusted under 35 U.S.C. 154(b) by 361 days.

(21) Appl. No.: 17/926,002

(22) PCT Filed: May 18, 2021

(86) PCT No.: PCT/EP2021/063174
§ 371 (c)(1),
(2) Date: Nov. 17, 2022

(87) PCT Pub. No.: WO2021/233928
PCT Pub. Date: Nov. 25, 2021

(65) Prior Publication Data
US 2023/0204076 A1    Jun. 29, 2023

(30) Foreign Application Priority Data
May 20, 2020    (EP) .................................... 20175584

(51) Int. Cl.
*F16D 1/108* (2006.01)
*F16D 1/10* (2006.01)

(52) U.S. Cl.
CPC ........ *F16D 1/108* (2013.01); *F16D 2001/103* (2013.01); *Y10T 403/559* (2015.01)

(58) Field of Classification Search
CPC .... F16C 3/023; F16C 3/03; F16D 1/02; F16D 1/101; F16D 1/108; F16D 3/06;
(Continued)

(56) References Cited

U.S. PATENT DOCUMENTS 573,203 A * 12/1896 Budke .................. F16B 7/0413
403/298
819,909 A * 5/1906 Muller .................. F16B 7/0413
403/298
(Continued)

FOREIGN PATENT DOCUMENTS

CN           201794883 U      4/2011
CN           107433973 A     12/2017
(Continued)

OTHER PUBLICATIONS

Office Action, Korean Patent Application No. 10-2022-7039420, mailed Jul. 7, 2024, 10 pages.
(Continued)

*Primary Examiner* — Josh Skroupa
(74) *Attorney, Agent, or Firm* — Sage Patent Group

(57) ABSTRACT

A shaft system for transmitting a torque includes a first component configured to deliver torque from a drive shaft, a first shaft connectable to the first component, and a second shaft connectable to, and axial extendable relative to, the first shaft. The first shaft includes a toothed structure configured to mate with a toothed structure of the first component in a first coupling, and to mate with a toothed structure of the second shaft in a second coupling, such that in operation of the shaft system, torque is transferred from the first component to the second shaft via the first shaft.

17 Claims, 3 Drawing Sheets

(58) Field of Classification Search
CPC . F16D 2001/103; H01F 29/04; H01H 9/0005; H01H 9/0027; H01H 9/0044; Y10T 403/559; Y10T 403/7026; Y10T 403/7033
USPC ............ 464/162, 182; 403/298, 359.1, 359.5
See application file for complete search history.

(56) References Cited

U.S. PATENT DOCUMENTS

| | | | |
|---|---|---|---|
| 4,307,797 A | 12/1981 | Belansky | |
| 6,883,604 B2 * | 4/2005 | Mack | F16D 1/108 464/182 |
| 8,591,205 B2 * | 11/2013 | Brown | E21B 43/128 403/293 |
| 9,702,360 B2 * | 7/2017 | Meyer | F16D 1/10 |
| 10,072,425 B1 * | 9/2018 | Madden | F16B 7/0413 |
| 11,735,976 B2 * | 8/2023 | Peng | F16C 3/023 310/75 D |
| 2002/0179305 A1 | 12/2002 | Mack et al. | |
| 2016/0186731 A1 | 6/2016 | Meyer et al. | |
| 2017/0227045 A1 | 8/2017 | Katayama et al. | |
| 2019/0063504 A1 * | 2/2019 | Paros | F16D 1/02 |
| 2019/0093709 A1 * | 3/2019 | Slayter | F16D 1/02 |

FOREIGN PATENT DOCUMENTS

| | | | |
|---|---|---|---|
| DE | 19853798 C1 * | 9/2000 | ............ F16D 1/027 |
| EP | 1338813 | 8/2003 | |
| EP | 3 409 964 A1 | 12/2018 | |
| JP | 2001214943 A * | 8/2001 | ....... F16D 2001/103 |
| JP | 2017147261 A | 8/2017 | |
| WO | WO 2006/119817 A1 | 11/2006 | |

OTHER PUBLICATIONS

International Search Report and Written Opinion of the International Searching Authority, PCT/EP2021/063174, mailed Aug. 31, 2021, 13 pages.

Chinese Office Action and Search Report, Chinese Patent Application No. 202180036257.0, mailed Jun. 30, 2025, 6 pages.

* cited by examiner

SHAFT SYSTEM

CROSS REFERENCE TO RELATED APPLICATIONS

This application is a 35 U.S.C. § 371 national stage application of PCT International Application No. PCT/EP2021/063174 filed on May 18, 2021, which in turns claims foreign priority to European Patent Application No. 20175584.0, filed on May 20, 2020, the disclosures and content of which are incorporated by reference herein in their entirety.

FIELD OF THE INVENTION

The present disclosure relates generally to a shaft system. The disclosure more particularly relates to a shaft system for transferring a torque.

BACKGROUND OF THE INVENTION

Shaft systems are widely used to transfer torque and rotation between a rotatable drive shaft connected to a rotating generating means, e.g., a motor, and a rotatable driven shaft (or another driven component of the drive train). Thus, an input torque of the drive shaft is transferred or transmitted, to an output torque of the driven shaft.

To allow for variations in the alignment and distance between the drive shaft and any driven components or shafts, the shaft system typically incorporate one or more couplings (e.g., universal joints, jaw couplings, rag joints, a splined joint or prismatic joint). The couplings may e.g., be used to connected two subsequent shafts. In applications where the shafts may be axially, angularly, and/or radially misaligned, flexible couplings can be utilized. Such flexible couplings are preferably capable of carrying high torque and high bending stress.

The shafts in the shaft system are thus torque carriers, and subject to torsion and shear stress. The shafts, and any coupling used to connect the shafts, need to be strong enough to bear the stress of the system, while avoiding too much additional weight and increase of inertia. Another issue with high functional and reliable shaft systems is the relatively high number of components.

There is thus a need in the industry for an improved shaft system.

SUMMARY

An object of the present disclosure is to overcome at least some of the above problems, and to provide a shaft system which, at least to some extent, is improved compared to prior art solutions. This, and other objects, which will become apparent in the following are accomplished by means of a shaft system.

According to a first aspect of the present disclosure, a shaft system for transmitting a torque is provided. The shaft system comprises:
  a first component configured to deliver torque from a drive shaft, said first component having an end section with a curved toothed structure,
  a first shaft connectable to the first component,
  a second shaft connectable to, and axial extendable relative to, the first shaft, said second shaft having an end section with a toothed structure
  wherein the first shaft comprises a toothed structure configured to mate with the toothed structure of the first component in a first coupling, and to mate with the toothed structure of the second shaft in a second coupling, such that in operation of the shaft system, torque is transferred from the first component to the second shaft via the first and second couplings.

Hereby, a simple yet effective shaft system for transmitting torque is provided. The shaft system comprises relatively few components compared to prior art solutions, and thereby facilitate assembly of the shaft system. Moreover, the shaft system combines various functions into single/few components in an effective manner. For example, the shaft system combines coupling functionality together with axial and angular adaptation possibilities. More specifically, the first shaft, and its coupling to the first component in the first coupling, allows for angular misalignment of the drive shaft and the first shaft, while the first shaft also enables axial extension adjustment possibilities by its coupling to the second shaft in the second coupling.

According to at least one example embodiment, the first component is a gear, e.g., a curved tooth gear. According to at least one example embodiment, the first component is connectable to the drive shaft to which the shaft system, in operation, is connected to in order to transfer torque. According to at least one example embodiment, the first component is connected to the drive shaft, or is forming an integrated part of the drive shaft. Thus, the drive shaft may be comprised in the shaft system. According to at least one example embodiment, the first component is a shaft. The first component may be referred to as a shaft misalignment compensation component.

According to at least one example embodiment, the first coupling is configured to enable angular misalignment of the drive shaft and the first shaft.

The curved toothed structure allows for misalignment(s) between the drive shaft and the first shaft. For example, the curved toothed structure is configured to, in operation (i.e., during torque transfer from the drive shaft to the shaft system), compensate for angular shaft misalignment. According to at least one example embodiment, the curved toothed structure is a curved tooth gear or crowned tooth gear. The first component may furthermore be configured to compensate for axial and/or radial misalignment between the drive shaft and the first shaft.

According to at least one example embodiment, the first coupling is configured for synchronization adjustment.

Hereby, the shaft system may advantageously be used to transfer torque to a transformer, or other torque transfer generator dependent on synchronization adjustment. In other words, the shaft system may be configured to transfer torque to a transformer and provide the needed synchronization adjustment possibilities.

The synchronization adjustment may e.g., be embodied the number of teeth in the curved toothed structure and toothed structure of the first shaft, i.e. the first coupling, or at least by the different angular connections provided by the first coupling between the first component and the first shaft. For example, the number of teeth in the curved toothed structure of the first component may be between 18 and 72, such as e.g., 36.

For example, in embodiments where the shaft system is coupled to a transformer, and the transformer is connected to the grid, the shaft system may be configured for synchronization adjustment by the first coupling and the curved toothed structure such that incongruity in phase synchronization is accounted for.

According to at least one example embodiment, the shaft system is configured for a tap changer, such as for example a tap changer for a transformer connected to the grid. For such embodiments, the shaft system is forming at least a part of the tap changer.

According to at least one example embodiment, the first shaft comprises a first end section configured to mate with the end section of the first component, and a second end section configured to mate with the end section of the second shaft, wherein the toothed structure of the first shaft extends from the first end section to the second end section.

Hereby, a simple and yet functional first shaft is provided, in which the toothed structure used in the first coupling at the first end section, extends further throughout the first shaft and to the toothed structured used in the second coupling at the second end section. Hereby, assembly of the shaft system is facilitated, and furthermore manufacturing of such first shaft is simplified compared to a shaft having different connecting means at the first and second end sections.

In operation of the shaft system, the first shaft, and its toothed structure, receives a torque from the drive shaft via the first coupling and the curved toothed structure of the first component, whereby the toothed structure further transfers the torque via the toothed structured in the second coupling to the second shaft.

According to at least one example embodiment, the same toothed structure of the first shaft is used for both the first and second couplings.

Hereby, both assembly and manufacturing of the first shaft are improved. Thus, installation of the first shaft may be made independently of its direction.

According to at least one example embodiment, the first shaft is a hollow shaft having an inner facing surface comprising the toothed structure of the first shaft.

This is advantageous as it facilitates assembly of the shaft system. Moreover, by having the toothed structure arranged on an inner facing surface, the toothed structure is covered and thereby protected from external wear or debris. It should be understood that the inner facing surface is a surface facing a geometrical center axis of the first shaft. In other words, the first shaft has an outer surface facing away from the geometrical center axis of the first shaft, and the inner facing surface is arranged opposite to the outer facing surface. The inner facing surface may be referred to as an inner enveloping surface.

According to at least one example embodiment, the second shaft has an outer facing surface comprising the toothed structure of the second shaft.

Hereby, the toothed structure of the second shaft is readily accessible for external connection. Moreover, assembly is facilitated and manufacturing of the second shaft is simplified. The outer facing surface is a surface facing away from a geometrical center line of the second shaft.

According to at least one example embodiment, the second shaft is axial insertable into the first shaft such that the toothed structure of the outer facing surface of the second shaft mates with the toothed structure of inner facing surface of the first shaft.

Hereby, a simple yet effective means for adapting the axial extension of the shaft system is provided. The first shaft and the second shaft may be referred to as being telescopically arranged. Thus, the second coupling does not only provide torque transfer means from the first shaft to the second shaft, but also provide axial extension adaption possibilities. In other words, such telescoping and mating arrangement of the toothed structure of the first and second shafts enables the second coupling to transfer torque and adapt the axial extension of the shaft system. The radial extension of the second shaft typically match, or is smaller than, the diameter of the cavity forming the hollow first shaft, enabling insertion of the second shaft into the first shaft. Stated differently, the second shaft is sized and dimensioned to be insertable into the first shaft.

According to at least one example embodiment, the shaft system further comprises a third shaft connectable to, and axial extendable relative to, the second shaft, said third shaft having an end section with a toothed structure configured to mate with the toothed structure of the second shaft in a third coupling, such that in operation of the shaft system, torque is further transferred from the second shaft to the third shaft via the third coupling.

Hereby, the shaft system can be readily extendable in an efficient manner.

According to at least one example embodiment, the third shaft is a hollow shaft having an inner facing surface comprising the toothed structure of the third shaft.

Thus, the third shaft may be configured correspondingly to the first shaft, with the same or similar advantageous effects. Moreover, by having the same/similar components in the shaft system, both assembly and manufacturing of the shaft system are improved.

According to at least one example embodiment, the second shaft is axial insertable into the third shaft such that the toothed structure of the outer facing surface of the second shaft mates with the toothed structure of inner facing surface of the third shaft.

Hereby, a third coupling is provided, the third coupling being configured correspondingly to the second coupling, with the same or similar advantageous effects. Thus, in operation, torque is transferred from the drive shaft to the third shaft via the first, second and third couplings.

According to at least one example embodiment, the shaft system further comprises a spacer arrangeable onto said second shaft, such that the first shaft and/or the third shaft is configured to abut the spacer.

In other words, upon axial insertion of the second shaft into the first shaft, the second shaft is insertable into the first shaft until the first shaft abuts the spacer. Additionality or alternatively, upon axial insertion of the second shaft into the third shaft, the second shaft is insertable into the third shaft until the third shaft abuts the spacer. The spacer is typically hollow and has an extension in the radial direction corresponding to that of the first shaft and/or the second shaft. The spacer may e.g., be a cut-off portion of the first shaft or the second shaft. According to at least one example embodiment, the spacer comprises at least two parts, or halves, which may be arranged to clamp to the second shaft.

According to at least one example embodiment, the axial extension of the portion of the shaft system comprising the first, second and third shafts is, in operation, defined by the sum of axial extension of the first shaft, the spacer and the third shaft, respectively.

Thus, the second shaft, which at least partly is inserted into the first and third shafts, only contribute to the axial extension of the system with regards to a portion which is covered by the spacer. The complete axial extension of the shaft system may e.g., be defined as the sum of axial extensions of the following components, the first component, the first shaft, the third shaft and the spacer. Alternatively, in embodiments in which the spacer and the third shaft is omitted, the complete axial extension of the shaft system may be defined as the sum of axial extensions of the following components, the first component, the first shaft, and the second shaft, less any overlapping axial extension of the first and second shaft owing to the second coupling.

According to at least one example embodiment, the shaft system further comprises a fixation unit configured to, in operation, press the first shaft, the spacer and the third shaft against the second shaft.

Hereby, the spacer can be kept in position in an effective manner. The fixation unit may e.g., be a clamping unit configured to clamp a portion of the first shaft, the spacer, and a portion of the third shaft to the second shaft. By such fixation unit, the toothed structures of the shafts in the second and third couplings are pressed together improving the reliability of torque transfer.

According to at least one example embodiment, the shaft system is free of fasteners, such as e.g., screws and pins. Hereby, the number of components in the shaft system can be kept relatively low. Additionality, this further facilitates assembly of the shaft system. For example, at least the first coupling and/or the second coupling is/are free of fasteners, such as e.g., screws and pins.

According to at least one example embodiment, in operation, the shaft system is configured to transfer torque between the shafts solely via the toothed structure of the shafts.

That is, e.g., between the first and second shafts, and possibly between the second and third shafts. Hereby, fasteners, such as e.g., screws and pins, are redundant and can be omitted.

According to at least one example embodiment, at least one of, such as eg., all of, the first, second and third couplings are flexible couplings. According to at least one example embodiment, at least the first and second shafts are at least partly co-axial, and at least extend along the same longitudinal axis. The first component may additionality extend along the same longitudinal axis as the drive shaft and the first shaft (i.e. be arranged linearly). Additionality, the third shaft and the second shaft may at least partly be co-axial, and at least extend along the same longitudinal axis.

It should be understood that the term "in operation" typically indicates a torque transfer mode, i.e., where the first component is receiving torque from the drive shaft and transfers the torque to at least the second shaft via the first and second couplings. The term "in operation" may alternatively refer to an assembled state of the shaft system, in which the components of the shaft system is connected to each other and wherein the shaft system is arranged and configured to enable torque transfer from the drive shaft. In other words, the shaft system may be arranged in an unassembled state in which the components of the shaft system are disconnected or separated from each other. In the unassembled state, the design of the system may be carried out and at least the axial extension of the shaft system may be established. Thereafter, the axial extension of the shaft system is adapted to the design by e.g., adapting the length of the spacer (and/or the first, second and/or third shafts), whereafter the shaft system is assembled. In the assembled state, the first component, the first shaft, the second shaft and any of the other potentially included components such as the spacer, the third shaft and fixation unit are connected to each other as previously described.

BRIEF DESCRIPTION OF THE DRAWINGS

These and other aspects of the present inventive concept will now be described in more detail, with reference to the appended drawings showing an example embodiment of the inventive concept, wherein.

DETAILED DESCRIPTION OF EXAMPLE EMBODIMENTS

In the following description, for purposes of explanation and not limitation, specific details are set forth such as particular components, interfaces, techniques, etc. in order to provide a thorough understanding of the present invention. However, it will be apparent to those skilled in the art that the present invention may be practiced in other embodiments that depart from these specific details. In other instances, detailed descriptions of well-known components and methods are omitted so as not to obscure the description of the present invention with unnecessary detail.

Figure 1:
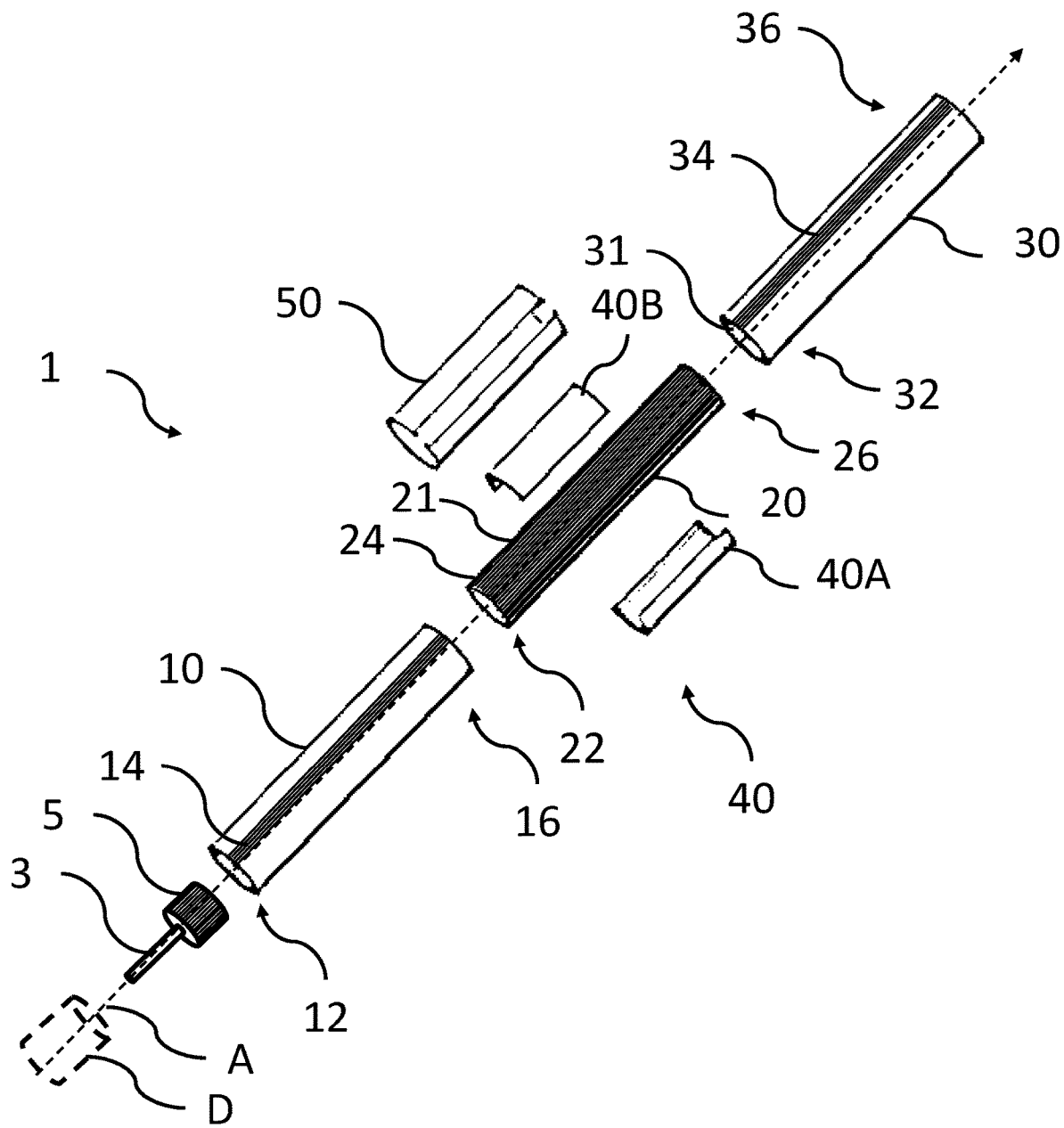
FIG. 1 schematically illustrates an exploded view of a shaft system in accordance with example embodiments disclosed herein.
Figure 2:
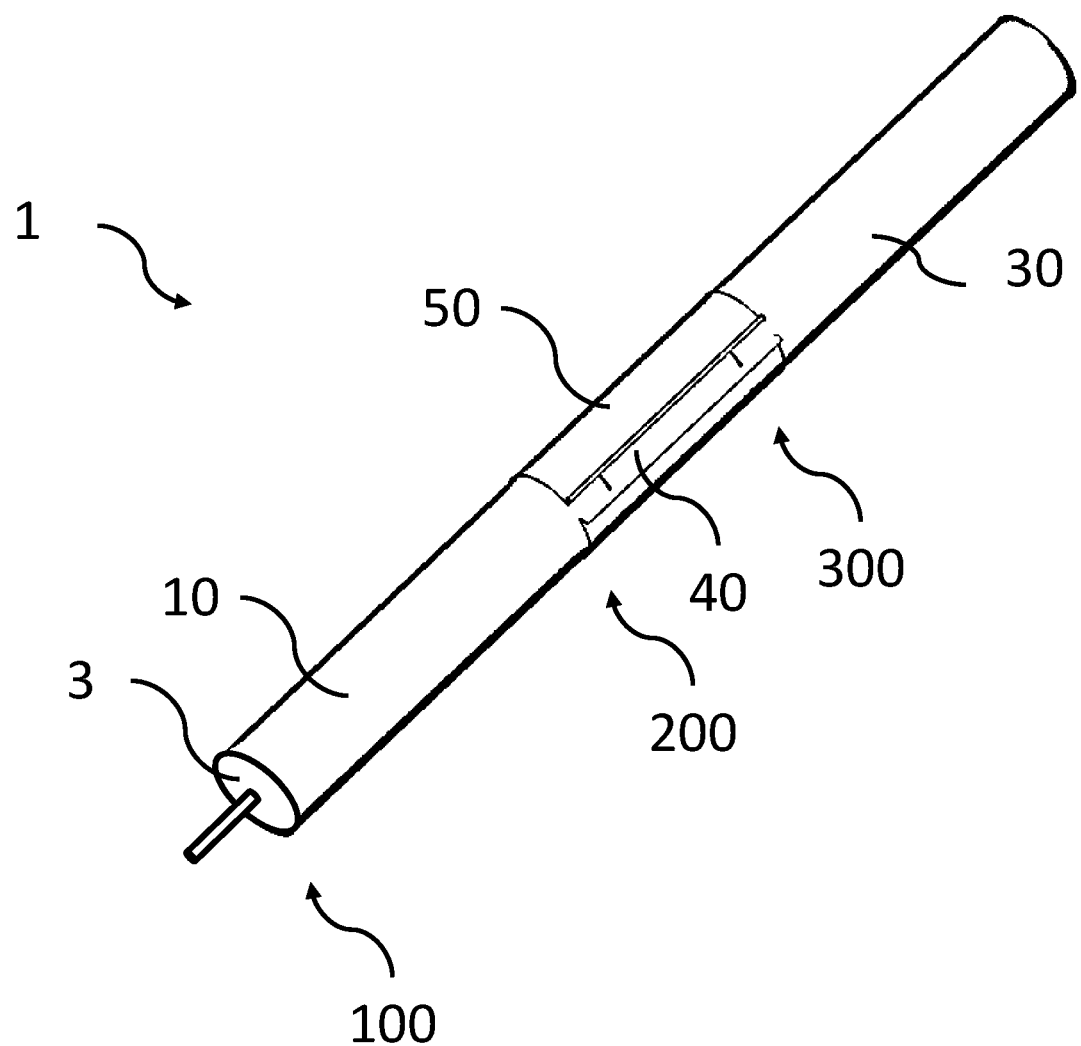
FIG. 2 is a perspective view of the shaft system of FIG. 1 in an assembled state.
Figure 3A:
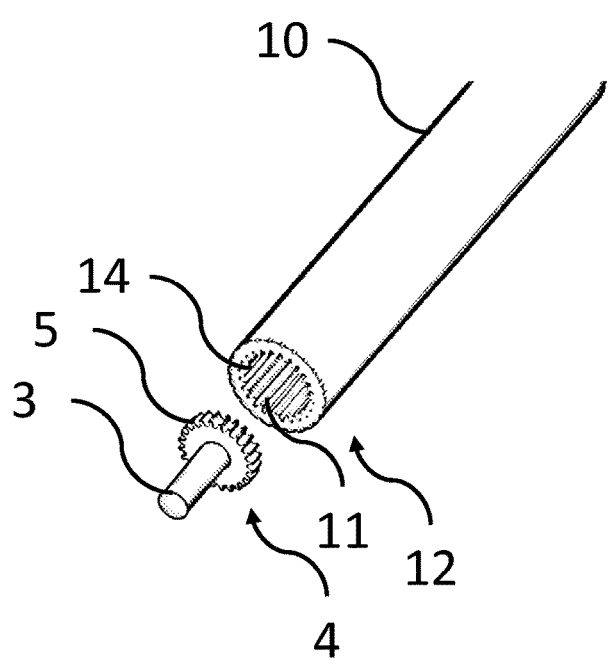
FIG. 3A and FIG. 3B show detailed views of the shaft system of FIG. 1.
Figure 3B:
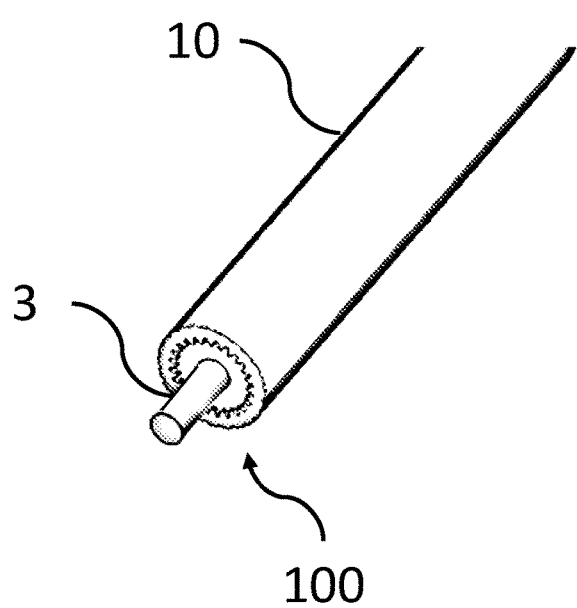

FIG. 1 shows an exploded view of the various components of an unassembled shaft system 1 in accordance with at least one example embodiment, and FIG. 3A and FIG. 3B show details views of the same shaft system 1. Moreover, in FIG. 2, the same shaft system 1 is shown in an assembled state, arranged and configured for transferring torque from a drive shaft.

The shaft system 1 comprises a first component 3 configured to deliver torque from a drive shaft D (only shown in part), a first shaft 10, a second shaft 20 and a third shaft 30. The shaft system 1 further comprises a spacer 40 and a fixation unit 50.

Each one of the first component 3, the first shaft 10, the second shaft 20 and the third shaft 30 comprises a toothed structured, 5, 14, 24, 34 described more in detail below. As shown in FIG. 1 together with FIG. 3A and FIG. 3B, the first component 3 comprises an end section 4 with a curved toothed structure 5, here arranged in an outer facing surface of the first component 3, the outer facing surface is facing away from a center axis A extending through the components of the shaft system 1.

As best shown in FIG. 3A, the first shaft 10 is a hollow shaft having an inner facing surface 11 comprising the toothed structure 14 of the first shaft 10 (only a part of the toothed structure 14 of the first shaft 10 is shown in a cut-away view in FIG. 1 disclosing the interior of the first shaft 10). The inner facing surface 11 of the first shaft 10 is thus a surface facing the center axis A. The first shaft 10 comprises a first end section 12, and an oppositely arranged second end section 16, wherein the toothed structure 14 of the first shaft 10 extends from the first end section 12 to the second end section 16.

As shown in FIG. 1, the second shaft 20 has an outer facing surface 21 comprising the toothed structure 24 of the second shaft, the outer facing surface facing away from the center axis A. The second shaft 20 comprises a first end section 22, and an oppositely arranged second end section 26, and the toothed structure 24 of the second shaft 20 extends from the first end section 22 to the second end section 26.

Also shown in FIG. 1, the third shaft 30 is a hollow shaft having an inner facing surface 31 comprising the toothed structure 34 of the third shaft 30 (only a part of the toothed structure 34 of the third shaft 30 is shown in a cut-away view in FIG. 1 disclosing the interior of the third shaft 30). The inner facing surface 31 of the third shaft 30 is thus a surface facing the center axis A. The third shaft 30 comprises a first end section 32, and an oppositely arranged second end section 36, and the toothed structure 34 of the third shaft 30 extends from the first end section 32 to the second end section 36. The third shaft 30 is in FIG. 1 configured correspondingly to the first shaft 10, that is, the first shaft 10 and the third shaft 30 are similarly designed, e.g., identically designed (except for the length).

The first shaft 10 is connectable to the first component 3 and is connectable to the second shaft 20. In more detail, the toothed structure 14 of the first end section 12 of the first shaft 10 is configured to mate with the toothed structure 5 of the end section 4 of the first component 3 in a first coupling 100, shown in the assembled state in FIG. 2 and FIG. 3B. The first component 3 is configured to, in operation, transfer torque from a drive shaft to first shaft 10 via the first coupling 100, that is, via the toothed structures 5, 14 of the first component 3 and the first shaft 10, respectively. Correspondingly, the toothed structure 14 of the second end section 16 of the first shaft 10 is configured to mate with the toothed structure 24 of the first end section 22 of the second shaft 20 in a second coupling 200, shown in the assembled state in FIG. 2. Thus, the same toothed structure 14 of the first shaft 10 is used for both the first and second couplings 100, 200. The first shaft 10 is configured to, in operation, transfer torque from the first component 3, to the second shaft 20 via the first and second couplings 100, 200. That is, transfer torque via the toothed structures 5, 14, 24 of the first component 3, the first shaft 10, and the second shaft 20, respectively.

The second shaft 20 is connectable to the first shaft 10 (as described in coupling 200) and is connectable to the third shaft 30. In more detail, the toothed structure 24 of the second end section 26 of the second shaft 20 is configured to mate with the toothed structure 34 of the first end section 32 of the third shaft 30 in a third coupling 300, shown in the assembled state in FIG. 2. The second shaft 20 is configured to, in operation, transfer torque from the first shaft 10, to the third shaft 30 via the second and third couplings 200, 300. That is, transfer torque via the toothed structures 14, 24, 34 of the first shaft 10, the second shaft, and the third shaft 30, respectively.

The shaft system 1 is thus configured to transfer torque between the first, second and third shafts 10, 20, 30 solely via the toothed structures 14, 24, 34 of the shafts.

The second shaft 20 is axial extendable relative to the first shaft 10 and is separately axial extendable relative to the third shaft 30. Hereby, the axial extension of the shaft system 1 can easily be adapted. In the embodiments of FIG. 1, the second shaft 20 is sized and dimensioned to be axial insertable into the hollow shafts of the first and third shafts, 10, 30, such that the toothed structure 24 of the outer facing surface 21 of the second shaft 20, in operation, mates with the toothed structure 14 of the inner facing surface 11 internally of the first shaft 10, and mates with the toothed structure 34 of the inner facing surface 31 internally of the third shaft 30.

As shown in FIG. 1, the shaft system comprises a spacer 40, here comprised of two separate parts, a first spacer part 40A and a second spacer part 40B, arrangeable onto the second shaft 20. By providing the spacer 40 in two separate parts 40A, 40B, the spacer 40 can easily be fitted onto the second shaft 20. Preferably, inner facing surfaces of the spacer 40 are provided with toothed structures to mate with the toothed structure 21 of the second shaft 20. Hereby, the spacer 40 may be radially locked to the second shaft 20. The spacer 40 is preferably fixated in its position by the fixation unit 50. The fixation unit 50 is configured to, in the assembled state, press the first shaft 10, the spacer 40 and the third shaft 30 against the second shaft 20. For example, the fixation unit 50 may be made resilient, with an axial extending slit, enabling the fixation unit 50 to be flexed, or bent, to be fitted around at least the spacer 40, and subsequently tightened to perform the pressing action. Additionality, or alternatively, the spacer 40 may be axially locked to the second shaft 20 by a separate locking arrangement. The first spacer part 40A may furthermore be connectable to the second spacer part 40B, such that upon fitting the first and second spacer parts 40A, 40B onto the second shaft 20, the first spacer part 40A connects to the second spacer part 40B, e.g., by a snap fit. The spacer 40 is sized and dimensioned such that the first and third shafts 10, 30, in the assembled state, abut the spacer 40. Hereby, the spacer 40 prevents further axial insertion of the second shaft 20 into the first and third shafts 10, 30.

Thus, only the portion of the second shaft 20 covered by the spacer 40 is not inserted into the first and third shafts 10, 30. In other words, a first portion of the second shaft 20 comprising the first end section 22 is inserted into first shaft 10 in such a way that the corresponding toothed structures 24, 14 mate, and a second portion of the second shaft 20 comprising the second end section 26 is inserted into the third shaft 30 in such a way that the corresponding toothed structures 24, 34 mate. Hereby, the axial extension of the portion of the shaft system 1 comprising the first, second and third shafts 10, 20, 30 is, in the assembled state, defined by the sum of axial extension of the first shaft 10, the spacer 40 and the third shaft 30, respectively. Thus, in practice, the length of the shaft system 1 may be set by adapting the length of the spacer 40, prior to assembly of the shaft system 1.

FIG. 2 shows the shaft system 1 of FIG. 1 in an assembled state in which torque may be transferred from the first component 3 to the third shaft 30 via the first, second and third couplings 100, 200, 300. As seen in FIG. 2, the fixation unit 50 fixates the spacer 40 in its position relative the second shaft 20.

In operation, the shaft system 1 is configured to enable angular misalignment of the drive shaft D and the first shaft 10. This is achieved by the curved toothed structure 5 of the first component 3, allowing up to at least 4 degrees angular misalignment. According to at least one example embodiment, the shaft system 1 is configured to enable angular misalignment of the drive shaft D and the first shaft 10 of between −4 degrees and +4 degrees. Moreover, the shaft system 1 is configured to enable synchronization adjustment. This is embodied by the number of teeth in the first coupling 100, shown best in FIG. 3A.

Embodiments of the present invention may be described in any one of the following points.

1. A shaft system for transmitting a torque, the shaft system comprising:
   a first component configured to deliver torque from a drive shaft, said first component having an end section with a curved toothed structure,
   a first shaft connectable to the first component,
   a second shaft connectable to, and axial extendable relative to, the first shaft, said second shaft having an end section with a toothed structure wherein the first shaft comprises a toothed structure configured to mate with the toothed structure of the first component in a first coupling, and to mate with the toothed structure of the second shaft in a second coupling, such that in operation of the shaft system, torque is transferred from the first component to the second shaft via the first and second couplings.
2. The shaft system according to point 1, wherein the first coupling is configured for synchronization adjustment.
3. The shaft system according to any one of the preceding points, wherein the first shaft comprises a first end section configured to mate with the end section of the first component, and a second end section configured to mate with the end section of the second shaft, wherein the toothed structure of the first shaft extends from the first end section to the second end section.
4. The shaft system according to point 3, wherein the same toothed structure of the first shaft is used for both the first and second couplings.
5. The shaft system according to any one of the preceding points, wherein the first shaft is a hollow shaft having an inner facing surface comprising the toothed structure of the first shaft.
6. The shaft system according to any one of the preceding points, wherein the second shaft has an outer facing surface comprising the toothed structure of the second shaft.
7. The shaft system according to points 5 and 6, wherein the second shaft is axial insertable into the first shaft such that the toothed structure of the outer facing surface of the second shaft mates with the toothed structure of inner facing surface of the first shaft.
8. The shaft system according to any one of the preceding points, further comprising a third shaft connectable to, and axial extendable relative to, the second shaft, said third shaft having an end section with a toothed structure configured to mate with the toothed structure of the second shaft in a third coupling, such that in operation of the shaft system, torque is further transferred from the second shaft to the third shaft via the third coupling.
9. The shaft system according to point 8, wherein the third shaft is a hollow shaft having an inner facing surface comprising the toothed structure of the third shaft.
10. The shaft system according to any one of points 6-7, and any one of points 8-9, wherein the second shaft is axial insertable into the third shaft such that the toothed structure of the outer facing surface of the second shaft mates with the toothed structure of inner facing surface of the third shaft.
11. The shaft system according to point 10, further comprising a spacer arrangeable onto said second shaft, such that the first and/or third shaft is configured to abut the spacer.
12. The shaft system according to point 11, wherein the axial extension of the portion of the shaft system comprising the second, third and third shafts is, in operation, defined by the sum of axial extension of the first shaft, the spacer and the third shaft, respectively.
13. The shaft system according to any one of points 11-12, further comprising a fixation unit configured to, in operation, press the first shaft, the spacer and the third shaft against the second shaft.
14. The shaft system according to any one of the preceding points, wherein the first coupling is configured to enable angular misalignment of the drive shaft and the first shaft.
15. The shaft system according to any one of the preceding points, wherein, in operation, the shaft system is configured to transfer torque between the shafts solely via the toothed structure of the shafts.

While the disclosure has been described in connection with what is presently considered to be practical embodiments, it is to be understood that the invention is not to be limited to the disclosed embodiments, but on the contrary, is intended to cover various modifications and equivalent arrangements. Additionally, variations to the disclosed embodiments can be understood and effected by the skilled person in practicing the claimed inventive concept, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A shaft system for transmitting a torque, the shaft system comprising:
   a first component configured to deliver torque from a drive shaft, said first component having an end section with a curved toothed structure,
   a first shaft connectable to the first component,
   a second shaft connectable to, and axial extendable relative to, the first shaft, said second shaft having a first end section with a toothed structure, wherein the second shaft has an outer facing surface comprising the toothed structure of the second shaft,
   wherein the first shaft comprises a toothed structure configured to mate with the toothed structure of the first component in a first coupling, and to mate with the toothed structure of the second shaft in a second coupling, such that in operation of the shaft system, torque is transferred from the first component to the second shaft via the first and second couplings and wherein the first shaft comprises a first end section configured to mate with the end section of the first component, and a second end section configured to mate with the first end section of the second shaft, wherein the toothed structure of the first shaft extends from the first end section to the second end section, wherein the second shaft comprises a second end section oppositely arranged with respect to the first end section of the second shaft, and the toothed structure of the second shaft extends from the first end section to the second end section of the second shaft; and
   wherein the torque is transferred between the first shaft and the second shaft solely via a coupling between the toothed structure of the first shaft and the toothed structure of the second shaft.

2. The shaft system according to claim 1, wherein the first coupling is configured for synchronization adjustment.

3. The shaft system according to claim 1, wherein the same toothed structure of the first shaft is used for both the first and second couplings.

4. The shaft system according to claim 1, wherein the first shaft is a hollow shaft having an inner facing surface comprising the toothed structure of the first shaft.

5. The shaft system according to claim 4, wherein the second shaft is axially insertable into the first shaft such that the toothed structure of the outer facing surface of the second shaft mates with the toothed structure of inner facing surface of the first shaft.

6. The shaft system according to claim 1, further comprising a third shaft connectable to, and axially extendable relative to, the second shaft, said third shaft having an end section with a toothed structure configured to mate with the toothed structure of the second shaft in a third coupling, such that in operation of the shaft system, torque is further transferred from the second shaft to the third shaft via the third coupling.

7. The shaft system according to claim 6, wherein the third shaft comprises a first end section, and an oppositely arranged second end section, and the toothed structure of the third shaft extends from the first end section to the second end section.

8. The shaft system according to claim 7, wherein the third shaft is a hollow shaft having an inner facing surface comprising the toothed structure of the third shaft.

9. The shaft system according to claim 1 wherein the second shaft is axially insertable into the third shaft such that the toothed structure of the outer facing surface of the second shaft mates with the toothed structure of inner facing surface of the third shaft.

10. The shaft system according to claim 9, further comprising a spacer arrangeable onto said second shaft, such that the first and/or third shaft is configured to abut the spacer.

11. The shaft system according to claim 10, wherein the axial extension of the portion of the shaft system comprising the first, second and third shafts is, in operation, defined by the sum of axial extension of the first shaft, the spacer and the third shaft, respectively.

12. The shaft system according to claim 10, further comprising a fixation unit configured to, in operation, press the first shaft, the spacer and the third shaft against the second shaft.

13. The shaft system according to claim 1, wherein the first coupling is configured to enable angular misalignment of the drive shaft and the first shaft.

14. The shaft system according to claim 1, wherein the shaft system is configured for a tap changer, such as a tap changer for a transformer connected to the grid.

15. The shaft system according to claim 14, wherein the shaft system is forming at least a part of the tap changer.

16. The shaft system according to claim 1, wherein the first shaft is a hollow shaft having an inner facing surface comprising the toothed structure of the first shaft, and wherein the second shaft has an outer facing surface comprising the toothed structure of the second shaft.

17. The shaft system according to claim 16, wherein the second shaft is axial insertable into the first shaft such that the toothed structure of the outer facing surface of the second shaft mates with the toothed structure of inner facing surface of the first shaft.

* * * * *